US007028889B2

(12) United States Patent
Jun

(10) Patent No.: US 7,028,889 B2
(45) Date of Patent: Apr. 18, 2006

(54) MEDIA CASSETTE AND MEDIA DISPENSER HAVING THE SAME

(75) Inventor: Dae-Keun Jun, Jeollabuk-Do (KR)

(73) Assignee: LG N-Sys Inc., Seoul (KR)

( * ) Notice: Subject to any disclaimer, the term of this patent is extended or adjusted under 35 U.S.C. 154(b) by 0 days.

(21) Appl. No.: 10/318,071

(22) Filed: Dec. 13, 2002

(65) Prior Publication Data

US 2003/0111789 A1 Jun. 19, 2003

(30) Foreign Application Priority Data

Dec. 13, 2001 (KR) ..................... 10-2001-0079031

(51) Int. Cl.
*G06F 17/60* (2006.01)

(52) U.S. Cl. ....................................... 235/379; 235/381

(58) Field of Classification Search ................ 235/379, 235/381; 705/43; 902/9, 13, 14
See application file for complete search history.

(56) References Cited

U.S. PATENT DOCUMENTS

| | | | | |
|---|---|---|---|---|
| 4,275,667 | A * | 6/1981 | Hilton | 109/44 |
| 4,370,006 | A * | 1/1983 | Graef et al. | 312/215 |
| 4,438,704 | A * | 3/1984 | Hutcheon | 109/44 |
| 4,529,118 | A * | 7/1985 | Granzow et al. | 902/9 |
| 4,580,422 | A * | 4/1986 | Wills | 70/63 |
| 4,593,895 | A * | 6/1986 | Myers et al. | 271/148 |
| 4,638,746 | A * | 1/1987 | Ishigure | 902/9 |
| 4,659,008 | A * | 4/1987 | Howett et al. | 902/13 |
| 4,704,061 | A * | 11/1987 | Peebles | 414/405 |
| 4,816,652 | A * | 3/1989 | Wildgoose et al. | 235/379 |
| 6,786,354 | B1 * | 9/2004 | Black et al. | 221/6 |

FOREIGN PATENT DOCUMENTS

| | | | |
|---|---|---|---|
| JP | 60244720 | A * | 12/1985 |
| JP | 06295380 | A * | 10/1994 |
| JP | 08282863 | A * | 10/1996 |
| JP | 2000306139 | A * | 11/2000 |

OTHER PUBLICATIONS

Pop-Up Cash Box, Mar. 1, 1984, IBM Technical Disclosure Bulletin, Issue 10B, vol. 26, pp. 5773-5774.*

* cited by examiner

*Primary Examiner*—Uyen-Chau N. Le
(74) *Attorney, Agent, or Firm*—Birch Stewart Kolasch & Birch LLP

(57) ABSTRACT

A media cassette includes a casing mounted on a mounting portion of a media dispenser, having a stack space in which media are stacked. A discharging slot is formed in the casing for discharging the media stacked in the stack space out of the casing in an edge direction of the media. A slot shielding unit opens the discharging slot when the casing is mounted on the mounting portion and shields the discharging slot when the casing is detached from the mounting portion.

2 Claims, 5 Drawing Sheets

MEDIA CASSETTE AND MEDIA DISPENSER HAVING THE SAME

BACKGROUND OF THE INVENTION

1. Field of the Invention

The present invention relates to a media cassette and a media dispenser having the same.

2. Description of the Background Art

An automatic teller machine (ATM) or a cash dispenser (CD) installed at a bank or a convenient store are devices for dispensing cash by a user's simple. handling.

The ATM has a media cassette in which media such as a bank note are stacked. Cash is dispensed outside by a transport unit through a discharging slot formed in the media cassette. Herein, in case that the media cassette is empty, the media cassette will be replaced by another media cassette where media are stacked.

However, the conventional media cassette has a problem that media are left out through the discharging slot by their weight when the media cassette is transported with the media stacked therein. The media left out from a media cassette have to be stacked in the media cassette again, thereby having a complicated problem.

SUMMARY OF THE INVENTION

Therefore, an object of the present invention is to provide a media cassette for opening a discharging slot thereof when the media cassette is mounted on a media dispenser and shielding the discharging slot when the media cassette is detached from the media dispenser and a media dispenser having the same.

To achieve these and other advantages and in accordance with the purpose of the present invention, as embodied and broadly described herein, there is provided a media cassette comprising: a casing mounted on a mounting portion of a media dispenser and having a stack space in which media are stacked; a discharging slot formed in the casing for discharging the media stacked in the stack space out of the casing in an edge direction of the media; and a slot shielding unit for opening the discharging slot when the casing is mounted on the mounting portion and shielding the discharging slot when the casing is detached from the mounting portion.

To further achieve these and other advantages and in accordance with the purpose of the present invention, as embodied and broadly described herein, there is provided a media dispenser comprising: a mounting portion; a casing mounted on the mounting portion and having a stack space where media are stacked; a discharging slot formed in the casing for discharging the media stacked in the stack space out of the casing in an edge direction of the media; and a slot shielding unit for opening the discharging slot when the casing is mounted on the mounting portion and shielding the discharging slot when the casing is detached from the mounting portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A media cassette and a media dispenser having the same will be explained with reference to attached drawings.

Figure 1:
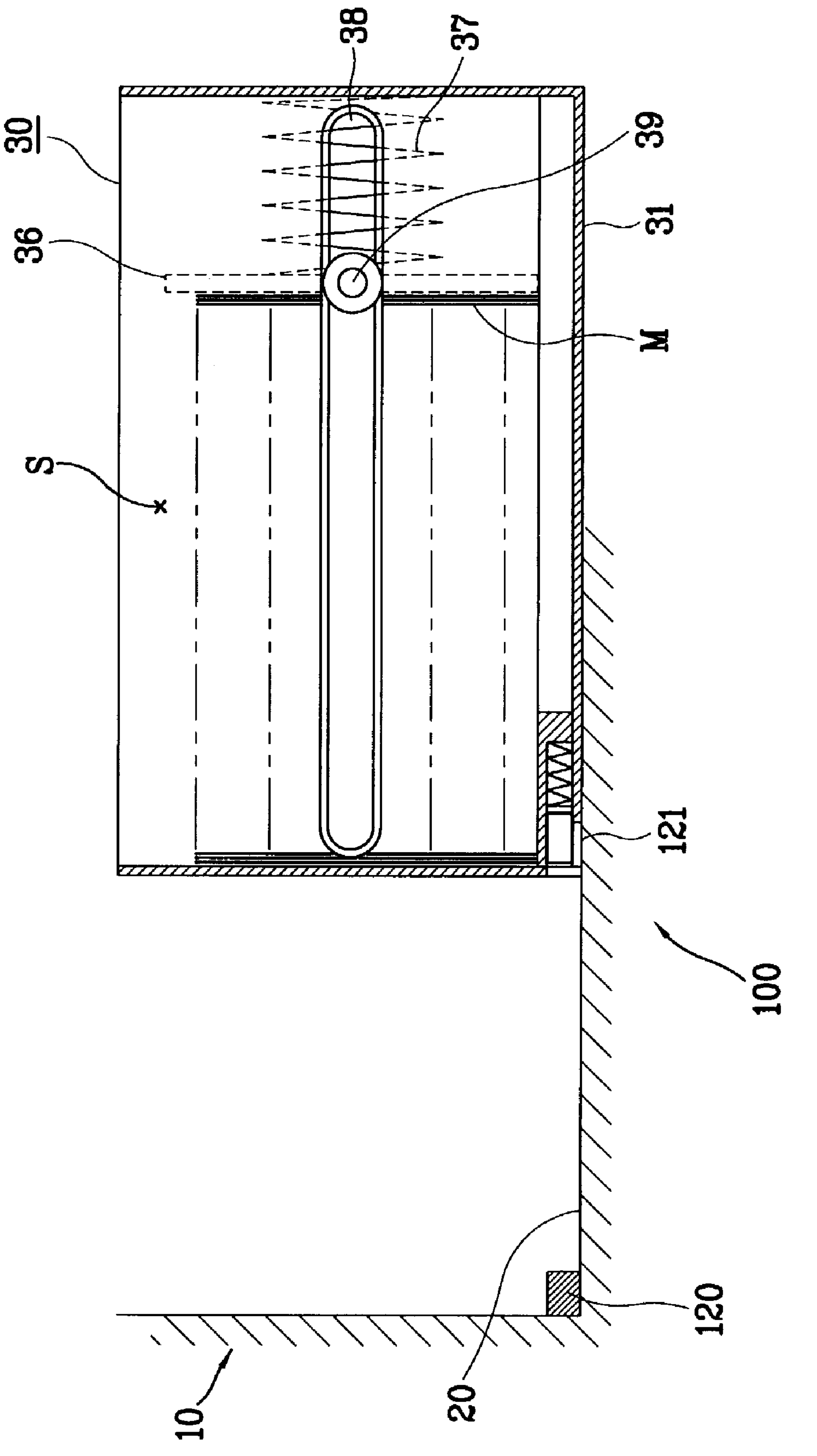
FIG. 1 is a lateral view of a media cassette according to the first embodiment of the present invention.
Figure 2:
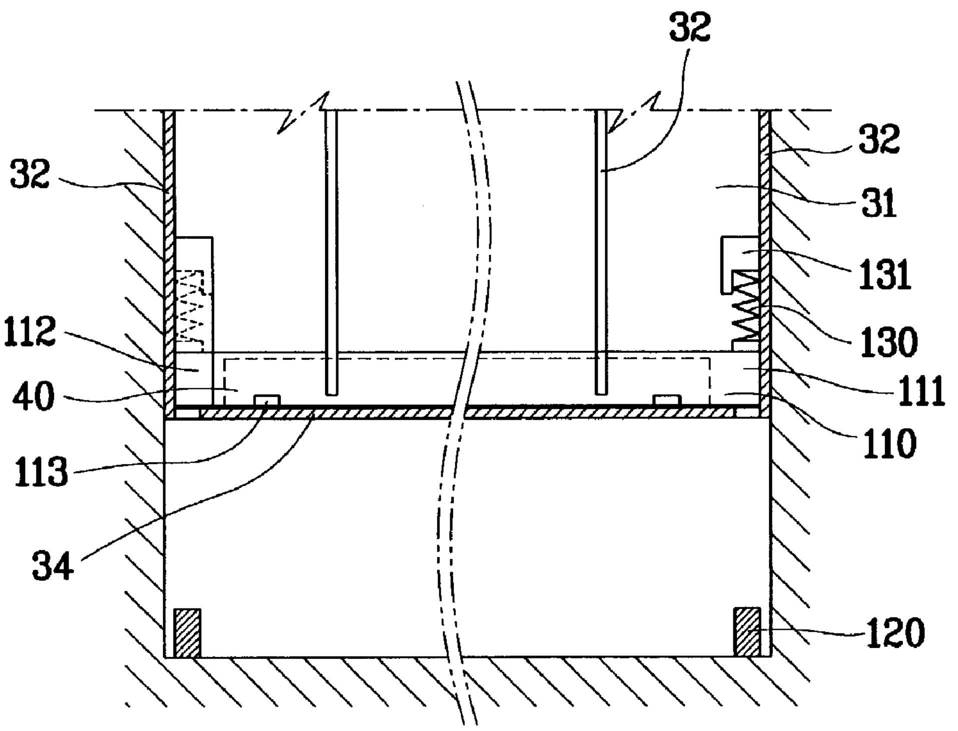
FIG. 2 is a sectional view showing an aspect before the media cassette of FIG. 1 is mounted on a media dispenser.
Figure 3:
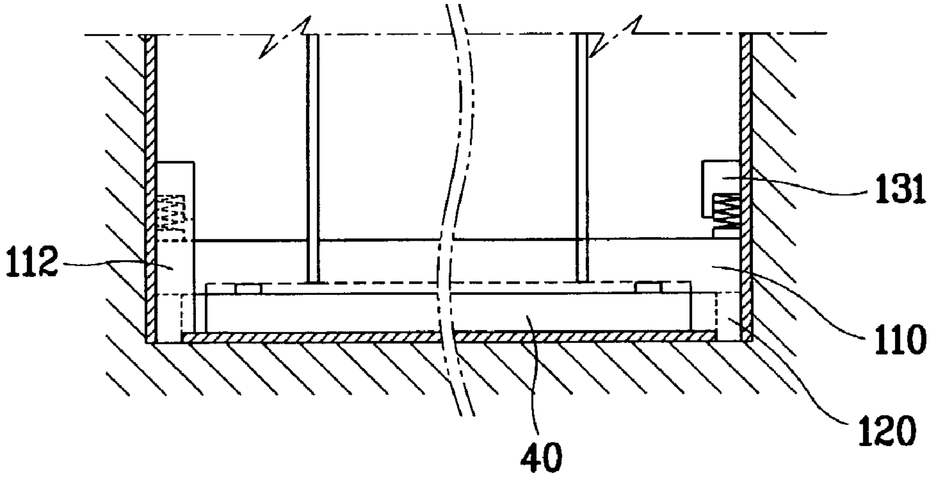
FIG. 3 is a sectional view showing an aspect after the media cassette of FIG. 1 is mounted on the media dispenser.

FIG. 1 is a lateral view of a media cassette according to the first embodiment of the present invention, FIG. 2 is a sectional view showing an aspect before the media cassette of FIG. 1 is mounted on a media dispenser, and FIG. 3 is a sectional view showing an aspect after the media cassette of FIG. 1 is mounted on the media dispenser.

As shown in FIGS. 1 to 3, the media cassette according to the first embodiment of the present invention comprises: a casing 30 mounted on a mounting portion 20 of a media dispenser and having a stack space S in which media (M) are stacked; a discharging slot 40 formed in the casing 30 for discharging the media stacked in the stack space S out of the casing 30 in an edge direction of the media; and a slot shielding unit 100 for opening the discharging slot 40 when the casing 30 is mounted on the mounting portion 20 and shielding the discharging slot 40 when the casing 30 is detached from the mounting portion 20.

The media dispenser 10 such as an automatic teller machine, etc. is a device for dispensing media outside from the media cassette where media such as a thin paper are stacked in an edge direction thereof.

An upper side of the casing 30 is opened, and as shown in FIG. 1, the casing 30 includes an pushing plate 36 for pushing the media stacked in the stack space S, and an elastic member 37 for adding elasticity force to the pushing plate 36.

The pushing plate 36 is connected to a pair of rollers 39 guided by a pair of slots 38 formed at both lateral surfaces of the casing 30.

Also, a slot (not shown) for contacting to a transport unit (not shown) installed at the mounting portion 20 of the media dispenser 10 is formed at a frontal surface 34 of the casing 30.

A step portion 41 can be formed at a bottom surface 31 of the casing 30 so that the media can have a predetermined interval with the bottom surface 31 of the casing 30.

The slot shielding unit 100, as shown in FIGS. 2 and 3, includes: a shielding member 110 installed at an upper portion of the bottom surface 31 of the casing 30 where the discharging slot 40 is formed and having an area identical or larger than that of the discharging slot 40; an operating member 120 installed on the mounting portion 20 for opening the discharging slot 40 by moving the shielding member 110 when the casing 30 is mounted on the mounting portion 20; and a restoring member 130 for restoring the shielding member 110 to an initial position when the casing 30 is detached from the mounting portion 20.

The slot shielding unit 100 can be installed below the bottom surface 31 of the casing 30.

Both end portions 111 of the shielding member 110 are installed at the casing 30 by a guide portion 112 so as to be linearly movable. Especially, a movement preventing protrusion 113 for preventing the shielding member 110 from moving out of the casing 30 is formed at an upper surface of the shielding member 110.

The guide portion 112 fixed to a lateral surface 32 or a bottom surface 31 of the casing 30 is formed as a slot at the bottom surface 31 of the casing so that the shielding member 110 can be linearly movable. Also, the guide portion 112 can be formed as a slot at the lateral surface 32 of the casing 30.

The operating member 120 is protruded at the mounting portion 20 corresponding to the frontal surface 34 of the casing 30.

A receiving portion 121 for receiving the operating member 120 is formed at the frontal surface 34 of the casing 30, the operating member 120 is inserted into the receiving portion 121, and opens the discharging slot 40 by moving both end portions 111 of the shielding member 110. Especially, the receiving portion 121 can be formed at both end portions of the frontal surface 34 of the casing 30.

The restoring member 130 for restoring the shielding member 110 to an initial position is formed by a coil spring or a plate spring in the first embodiment of the present invention. The restoring member 130 is fixed on the bottom surface 31 opposite to the frontal surface 34 on the basis of the shielding member 110 by a fixation member 131 formed at the bottom surface 31 of the casing 30. Especially, the guide portion 112 can be fixed to an upper surface of the fixation member 131.

In the media cassette according to the first embodiment of the present invention, as shown in FIG. 2, the media stacked in the casing 30 are not left out by their weight before mounted on the mounting portion 20 of the media dispenser 10 because the discharging slot 40 is shielded by the shielding member 110.

Also, when the media cassette is mounted on the mounting portion 20, the operating member 120 installed at the mounting portion 20 is inserted into the receiving portion 121 and pushes said both end portions 111 of the shielding member 110, thereby opening the discharging slot 40 as shown in FIG. 3.

Figure 4:
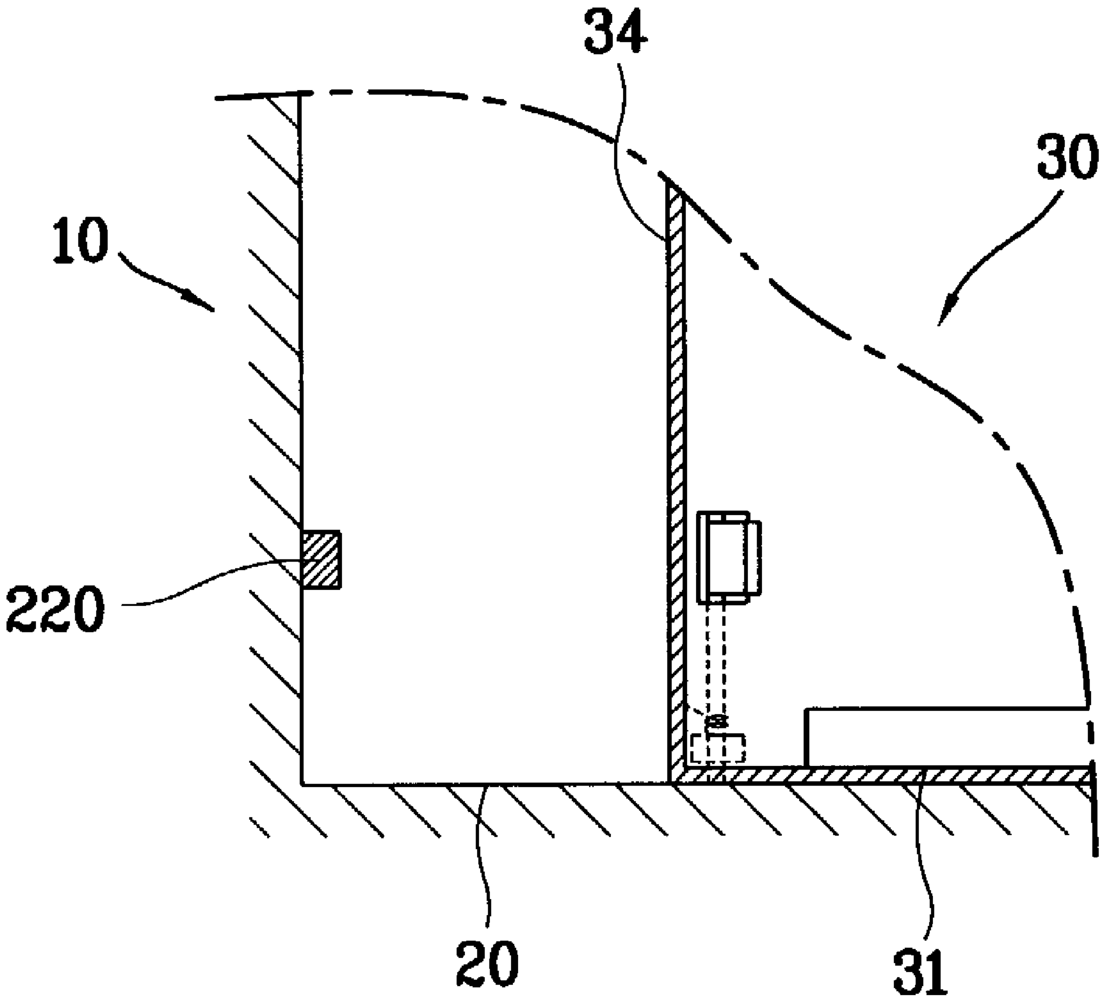
FIG. 4 is a lateral view of a media cassette according to the second preferred embodiment of the present invention.
Figure 5:
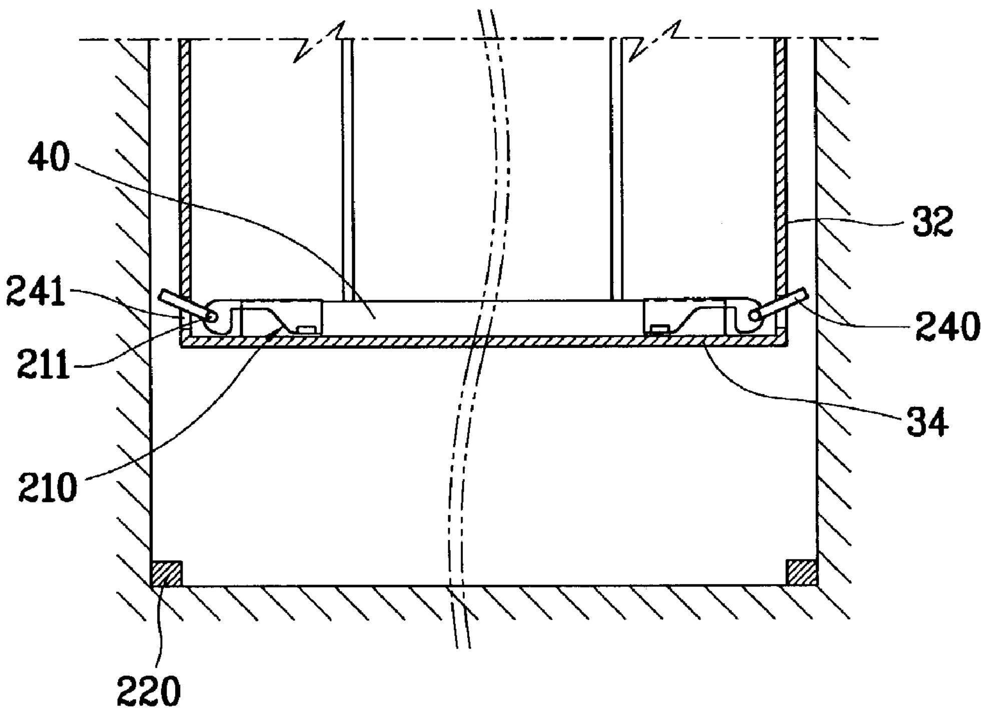
FIG. 5 is a sectional view showing an aspect before the media cassette of FIG. 4 is mounted on a mounting portion.
Figure 6:
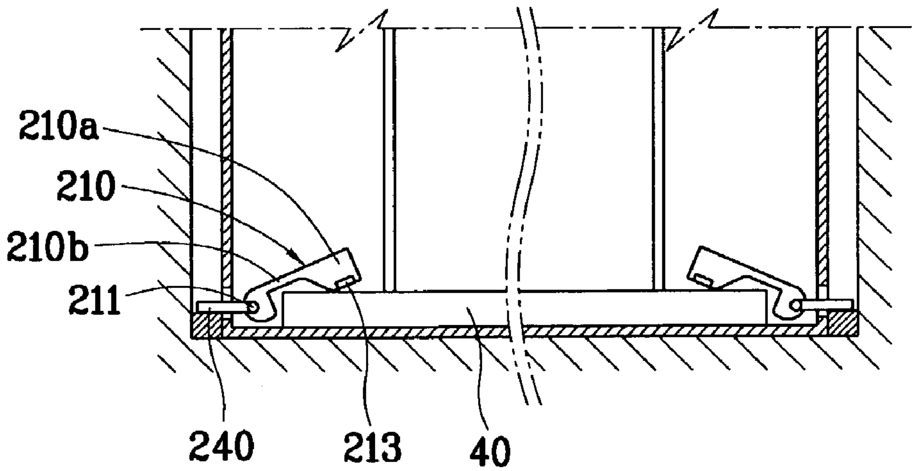
FIG. 6 is a sectional view showing an aspect after the media cassette of FIG. 4 is mounted on the mounting portion.
Figure 7:
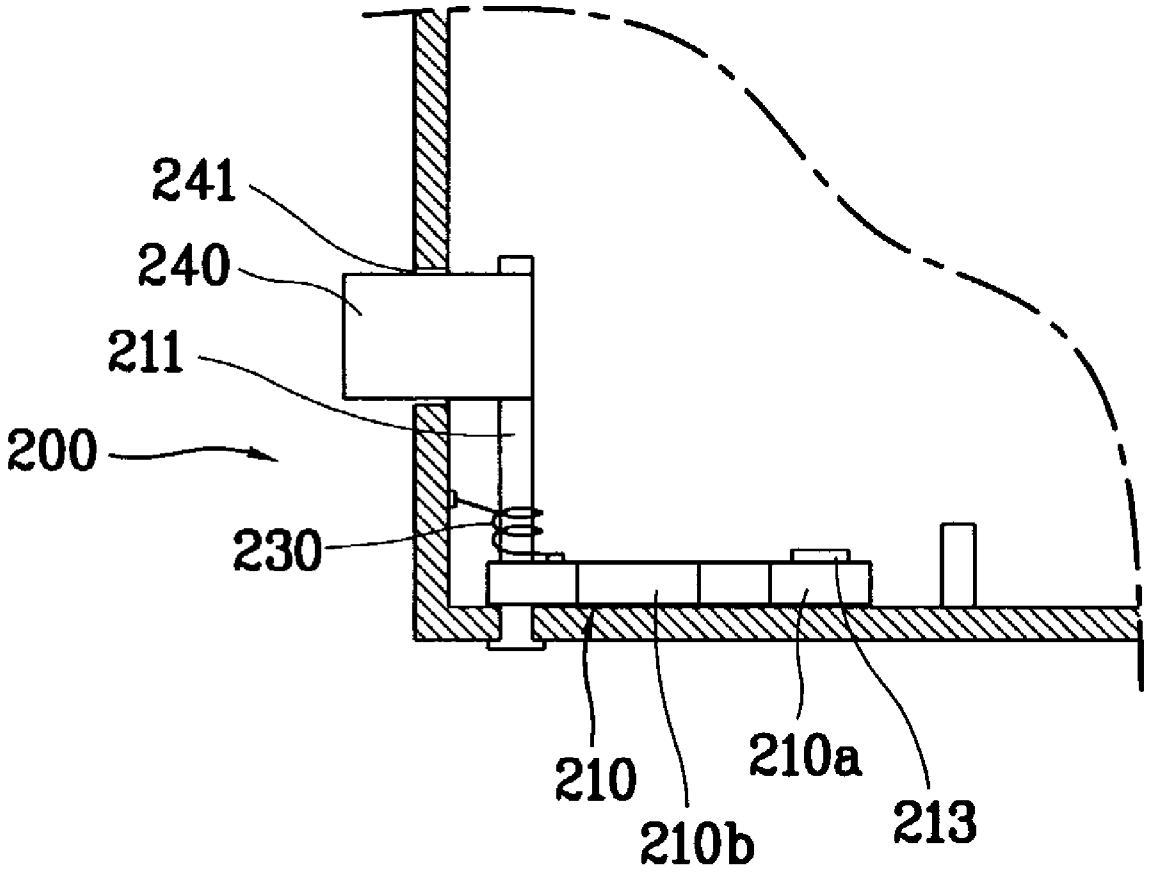
FIG. 7 is a construction view showing a construction of a slot shielding unit of the media cassette of FIG. 4.

FIG. 4 is a lateral view of a media cassette according to the second preferred embodiment of the present invention, FIG. 5 is a sectional view showing an aspect before the media cassette of FIG. 4 is mounted on a mounting portion, FIG. 6 is a sectional view showing an aspect after the media cassette of FIG. 4 is mounted on the mounting portion, and FIG. 7 is a construction view showing a construction of a slot shielding unit of the media cassette of FIG. 4.

A construction of the media cassette according to the second embodiment of the present invention is similar to that of the first embodiment except a construction of the slot shielding portion, thereby omitting its explanation.

The shielding member 210 of the slot shielding unit 200, as shown in FIGS. 4 to 7, is constructed as a pair, and an end portion thereof is fixed to a rotary shaft 211 rotatably installed at the bottom surface 31 of the casing 30 near both ends of the discharging slot 40. Also, an interacting member 240 for opening the discharging slot 40 by interacting with the operating member 220 and rotating the rotary shaft 211 is connected to the rotary shaft 211. Also, the restoring member 230 such as a torsion spring is constructed inserted to the rotary shaft 211.

The interacting member 240 is protruded out of the lateral surface 32 of the casing 30 through a through hole 241 formed at the lateral surface 32 of the casing 30.

Also, the operating member 220 is constructed as a pair of magnets protruded towards each side of the frontal surface 34 of the casing 30 when the casing 30 is engaged to the mounting portion 20 corresponding to the frontal surface 34 of the casing 30.

The shielding member 210 includes an end portion **210*a* having a width identical or larger than that of the discharging slot 40, and a middle portion 210*b* concavely cut between the end portion 210*a* and the rotary shaft 211**.

A movement preventing protrusion 213 for preventing the media from moving out of the frontal surface is formed at the upper surface of the shielding member 210.

In the media cassette according to the second embodiment of the present invention, as shown in FIG. 5, the media stacked in the casing 30 are not left out by their weight before mounted to the mounting portion 20 of the media dispenser 10 because the discharging slot 40 is shielded by the shielding member 210.

Also, as shown in FIG. 6, when the media cassette is mounted on the mounting portion 20, the interacting member 240 is engaged to the magnet, that is, the operating member 220 installed at the mounting portion 20, by magnetic force, thereby rotating the rotary shaft 211. As the rotary shaft 211 is rotated, the shielding member 210 is rotated, thereby opening the discharging slot 40.

Especially, in case that the media cassette according to the present invention is used in the ATM, media stacked in the media cassette is dispensed through the discharging slot by a transport unit with its operation.

The media cassette according to the present invention is provided with the slot shielding unit which is opened only when mounted on the media dispenser, so that the media stacked therein are not left out in a state that the media cassette is detached from the media dispenser.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A media cassette comprising:

a casing for mounting on a mounting portion of a media dispenser, said casing having a stack space in which media are to be stacked;

a discharging slot formed in said casing for discharging the media, stacked in said stack space, out of said casing in an edgewise direction of the media; and a slot shielding unit for opening said discharging slot when said casing is mounted on the mounting portion and for shielding said discharging slot when said casing is detached from the mounting portion, wherein said slot shielding unit is biased toward a direction which shields said discharging slot when said casing is removed from the mounting portion, and wherein said slot shielding unit is magnetically activated to open said discharging slot when said casing is mounted on the mounting portion, wherein said shielding unit includes at least one interacting member which moves through free space under an influence of a magnetic field to contact a magnet provided at the mounting portion, when said casing is mounted on the mounting portions;

wherein said shielding unit includes a rotary shaft, wherein said interacting member is attached to said rotary shaft and a shielding unit end portion is attached to said rotary shaft, and wherein when said interacting member is drawn toward the magnet of the mounting portion, said rotary shaft rotates so that said shielding unit end portion opens said discharging slot.

2. The media cassette of claim 1, wherein a spring tends to rotate said rotary shaft so that said shielding unit is biased to a position shielding said discharging slot, when said casing is detached from the mounting portion.

* * * * *